C. E. DURYEA.
MOTOR VEHICLE.
APPLICATION FILED JAN. 16, 1912.
1,149,431. Patented Aug. 10, 1915.
2 SHEETS—SHEET 1.
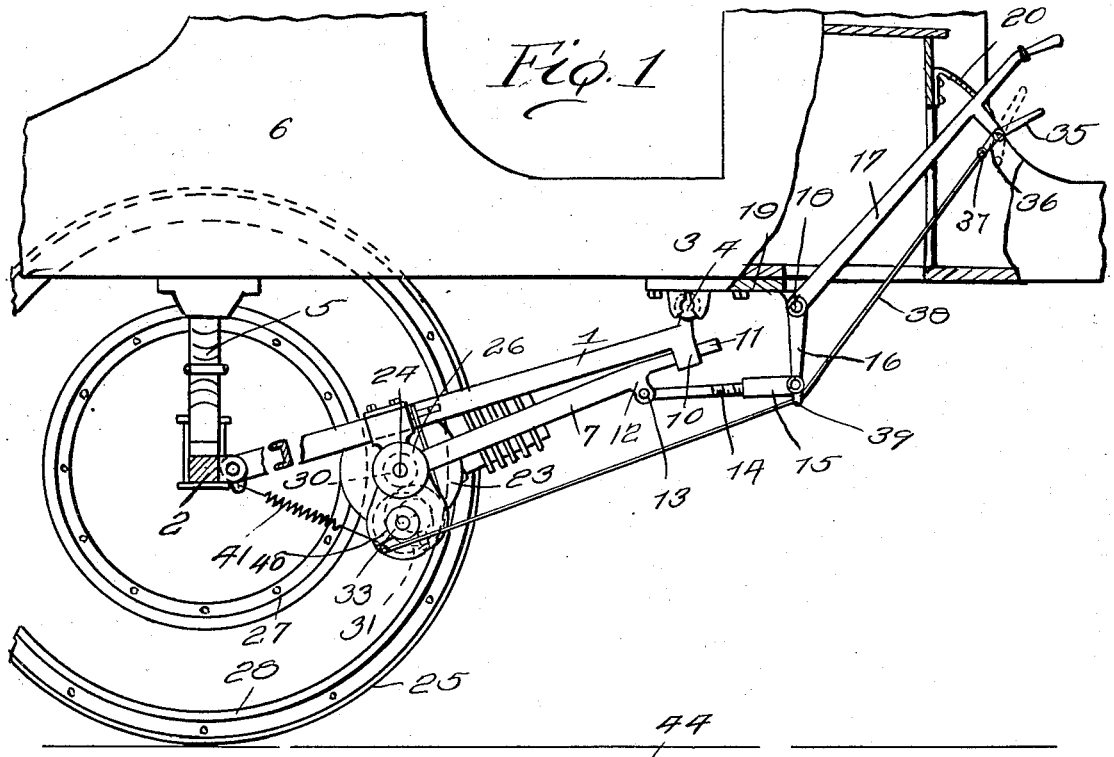
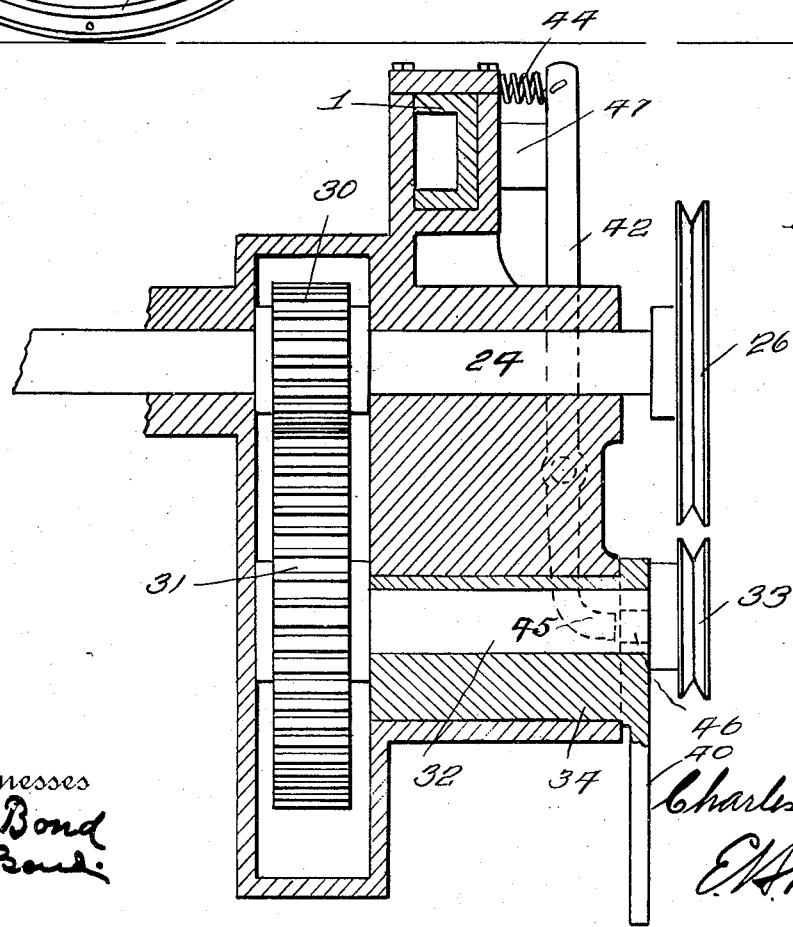
Witnesses
R. R. Bond
E. H. Bond
Inventor
Charles E. Duryea
E. H. Bond
Attorney C. E. DURYEA.
MOTOR VEHICLE.
APPLICATION FILED JAN. 16, 1912.
1,149,431.
Patented Aug. 10, 1915.
2 SHEETS—SHEET 2.
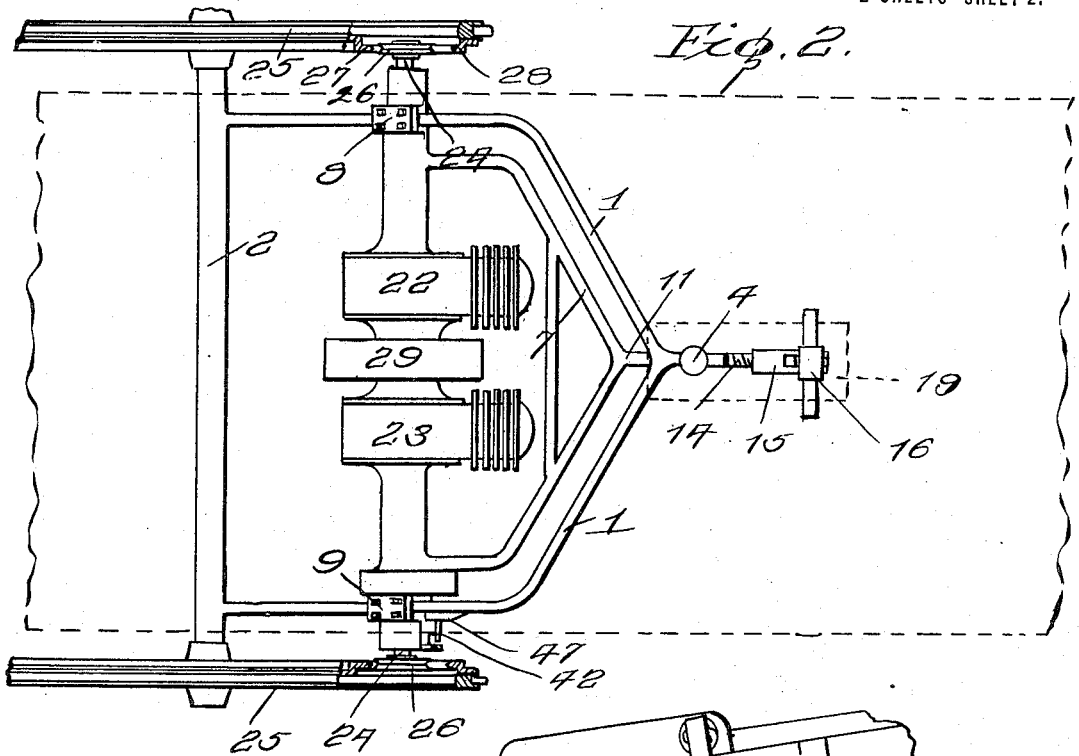
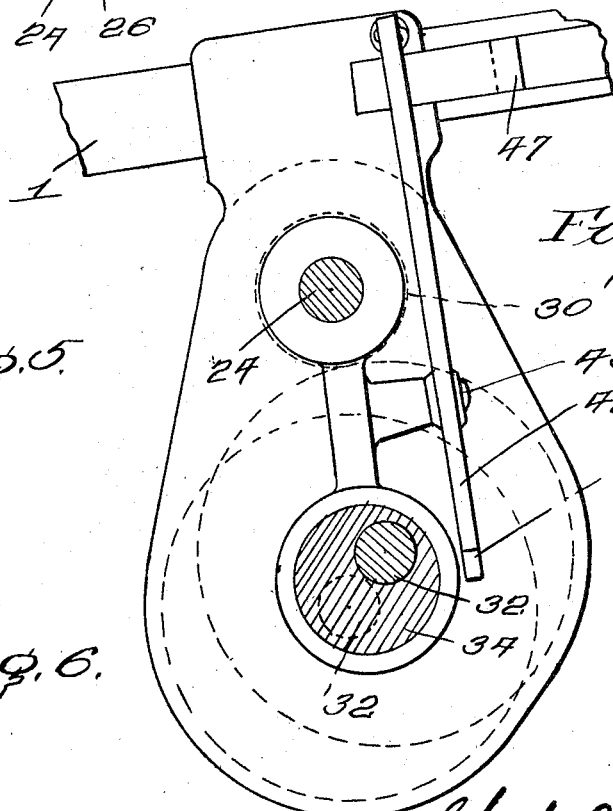
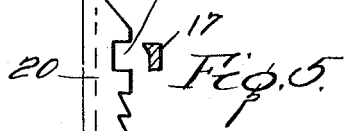
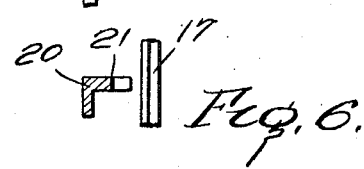
Witnesses
R. R. Bond.
Inventor
Charles E. Duryea
E. H. Bond
Attorney

UNITED STATES PATENT OFFICE.

CHARLES E. DURYEA, OF SAGINAW, MICHIGAN.

MOTOR-VEHICLE.

1,149,431.  Specification of Letters Patent.  Patented Aug. 10, 1915.

Application filed January 16, 1912. Serial No. 671,511.

*To all whom it may concern:*

Be it known that I, CHARLES E. DURYEA, a citizen of the United States of America, and resident of Saginaw, in the county of Saginaw and State of Michigan, have invented certain new and useful Improvements in Motor-Vehicles, of which the following is a specification.

This invention relates to certain new and useful improvements in motor vehicles of that class in which the motor shaft lies parallel with the rear axle and more particularly to that type of motor vehicles in which the driving power is transmitted to the wheels by frictional contact.

The present invention has for its objects among others to provide a frame and a motor hanging which will best preserve the relation of the friction contacts under the various road conditions, and to provide reliable and easily operated speed changes whereby the vehicle may be easily handled and further will be reliable in its driving ability when in operation.

It has for a further object to provide a double three point suspension with multiple frames, one of which is mounted for movement with relation to the other.

I employ multiple rollers of different sizes in the same plane with means for giving motion to the extra roller shafts and getting the rollers in position to drive without interfering with the other roller which ordinarily drives.

I provide a ring in proximity to the rim of the wheel whereby I am enabled to get the ring close to the plane of the wheel, thus bringing it closer to the ground so as to not only make a neater but a better drive. The construction is such that there is no lateral movement of the rollers and the rollers bear with equal friction on both of the wheel rings.

I aim further at improvements in the details of construction whereby better results are attained, the parts reduced to a minimum number and these capable of ready assemblage, not liable to get out of order and easily repaired when occasion requires.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation with portions broken away, showing a driving wheel, the driving roller gears and rings, the triangular frames and levers and links for operating the same, as well as a portion of the body of the vehicle. Fig. 2 is a top plan with portions in section and the body removed. Fig. 3 is a detail sectional elevation showing the construction of the speed change device. Fig. 4 is a cross section of the same. Fig. 5 is an enlarged detail of the segmental rack and the coöperating lever, the latter being shown in section. Fig. 6 is a detail of the same parts, the rack being shown in cross section and the lever in elevation.

Like numerals of reference indicate like parts throughout the different views.

It has been demonstrated by practical tests that a three point support does not subject the supporting frame to distortion or twisting action on rough roads. I, therefore, employ a frame 1 which is rigid with the rear axle 2 and at its forward end is connected with the under side of the body 3 by ball and socket means 4, as seen best in Fig. 1.

Above the rear axle 2 and in the vertical plane thereof is the spring 5, omitted from Fig. 2 for the better illustration of the other parts, and on which the center of the rear end of the body 6 rests, as seen in Fig. 1, the mode of supporting the body being such as may be deemed preferable. This frame is preferably formed of channel steel so as to be light and stiff, although tubing or other material may be employed as circumstances may demand. Mounted on this frame 1 is a frame 7 which is forked, as shown, as is also the frame 1, the rear ends thereof being connected with the engine case and carrying the weight at three points, one near each vehicle wheel and the third at the front of the frame 1 where a suitable support is provided. These points of support are such that one frame may be moved lengthwise of the vehicle while remaining free from sidewise motion. In the present instance I have chosen to show sliding supports at 8 and 9 near the ends of the engine shaft and at 10, the latter consisting of a depending lug on the frame 1 at a point substantially in vertical alinement with the ball and socket support 4, through which lug an extension 11 on the frame 7 has sliding movement. It is evident, however, that other means of providing relative movement of the two frames may be provided; swinging links, for instance, I should consider the equivalent of the means shown, it being understood that the invention is in no wise restricted to any particular means for permitting this relative movement of the two frames.

Suitable means as an ear 12 depends from the frame 7 and in this ear or lug is pivotally mounted, as at 13, one end of a link 14, the other end of which is made adjustable in any suitable manner, so as to increase or decrease the length of the link. In the present instance, I have chosen to show the end of the link as screw threaded and having threaded engagement in a collar or the like. 15, which is carried by the depending member 16 which, in this instance, is the short arm of the lever 17 pivotally mounted at 18 on the plate 19 secured to the under side of the body of the vehicle and which plate carries the socket member of the ball and socket mounting 4. This lever may be pivoted to this plate or to some adjacent or equivalent part of the vehicle, the said lever terminating within easy reach of the operator or driver of the vehicle and adapted to be moved in a general forward or back direction to shift the frame 7 on the frame 1. A segmental rack or ratchet bar 20 secured to the center wall of the vehicle body is designed to be engaged by the lever 17 to lock the same in any position of desired pressure. The rack 20 is provided with a deep notch 21, as seen in Fig. 5, in which the lever 17 can be placed when at its neutral or non-action point so as to hold the rollers, soon to be described, out of operative position.

The engine may be of any preferred form or type, although in the present instance I have indicated a two cylinder engine in Fig. 2 where 22 and 23 designate the cylinders, but for the purpose of this specification it is sufficient that the engine be carried by the frame 7 and that it has its shaft ends 24 projecting nearly to the vehicle wheels 25, as seen clearly in Fig. 2, which wheels are carried by the frame 1 and axle 2. Suitable bearings, of course, carry these long ends of the engine shaft.

On the ends of the engine shaft are the rollers 26, which are preferably grooved with one or more grooves and adapted to coöperate with one or the other of the rings 27 or 28 on the wheels 25. These rings are secured to the wheels 25, one within the other, being of different diameters, the ring 28 being secured near the periphery of the wheel. Upon reference to Figs. 1 and 2, it will be readily understood that when the engine fly wheel 29 runs with its top toward the back of the vehicle, it will be possible to throw the lever 17 forward and force the frame 7 backward until the rollers 26 mesh with the ring 27 which acts as a friction clutch until the vehicle is in motion forward at high speed due to the respective size of the roller and the ring. Likewise, it will be evident that a backward motion of this lever 17 will bring the frame 7 and, consequently, the rollers 26 forward against the ring 28 and then drive the vehicle backward at a slower speed due to the relatively larger size of the ring 28. No means are shown for holding the lever in engagement when reversing, as it is not common to drive so far that way, and it is equally true that the contact is not hard which permits a friction clutch action to largely prevail and the vehicle to move at much slower speed than the relative sizes of the roller and rings would indicate. By this construction it is evident that I have provided a simple arrangement by which it is possible to get a high speed forward and a reverse speed and the rollers 26 drive both wheels 25 alike so long as there is no distortion of the frames and that the triangular shapes and three point support frames practically prevent all distortion or side motion.

It is desirable to provide a further device for securing a low speed in order that the vehicle may be able to climb hills or traverse bad roads and while this device is occasionally necessary, it is not in constant use and, therefore, is designed for emergencies and is not rather than for continual service and is not put into operation except when desired. It is quite common in this class of devices in the construction of engine cases to divide them in the plane of the engine shaft and in the present instance I have assumed such division without showing it. In Fig. 3 the engine case integral with the frame 7 near one end is shown on an enlarged scale and as providing a housing for one end of the engine shaft 24 which is shown as carrying a toothed pinion 30 in addition to the roller 26. This pinion 30 meshes with another pinion 31 arranged in a plane below said pinion 30, this pinion 31 being carried by a short shaft 32 carrying a roller 33, the shaft 32 being journaled in an eccentric bearing 34 which, in turn, is carried by the engine case or frame 7. As shown in Fig. 3, the two pinions 30 and 31 are in mesh and the center of the eccentric 34 is up or in its near position with respect to the engine shaft 24. This corresponds to the dotted line position of the roller 33 in Fig. 1. It is to be noted that this roller 33 is smaller than the roller 26 and that in the near position it is much closer to the ring 28 than when it is in the down position, as shown in full lines in Fig. 1. From this, it will be apparent that when in the near position, the shaft 32 will be driven by the pinions and in a reverse direction from that of the shaft 24 and that the roller 33 will contact with the ring 28 before the roller 26 could come in contact, if the engine and frame 7 are thrown forward as for the reversing action hereinbefore described. This contact will drive the vehicle forward at reduced speed and with increased power due to the relative sizes of the pinions 30 and 31 and also due to the relative size of the roller 33 with respect to the ring 28 as compared with the sizes of the roller 26 and the ring 27. In order to get this desired action out of the shaft 32 and its roller 33 and pinion 31, I provide suitable means for operating the eccentric 34. In the present instance I have shown a foot pedal or the like 35 pivotally mounted, as at 36, and having connected therewith at one end, as at 37, a wire, cable or the like 38 which passes through an opening in the extension 39 of the short arm 16 of the operating lever and at its other end connected with an arm or lever 40 projecting from the eccentric 34. 41 is a spring attached at one end to said lever or arm 40 and at its other end to some fixed part as the rear axle 2 or a member of the frame 1 and tending to normally hold the eccentric 34 in its far position. Operation of the foot pedal 35 serves to bring the eccentric into the desired near position. The action of the pinions 30 and 31 in transmitting power might tend to hold the eccentric in this position or even carry it farther, but a stop suitably placed would serve to prevent such farther motion. By extending the ligament 38 through the extension 39, the motion of the lever 17 does not change the length of the wire. If a stop be employed, it might be of the order seen in Figs. 3 and 4 wherein is shown a catch 42 pivoted at 43 to some convenient part, a spring 44 being provided to connect the one end with a stationary part of the gear casing or other portion of the device, the other end being bent, as seen at 45, and adapted to engage in a notch or the like 46 in a flange on the eccentric whereby the latter is held in place. This catch cannot drop into the notch until the engine and frame 7 are moved forward slightly so as to carry the catch away from the trip 47 which is fixed to the frame 1. In use the operator throws the foot pedal 35 forward by his foot, which brings the shaft 32 into the near position. He then immediately follows this by moving the lever 17 and this moves the frame 7 and releases the catch 42 from the trip 47 and permits the end 45 to engage the notch 46 of the flange on the eccentric and hold the pinions in mesh so long as the frame 7 is in its forward position. When it is returend to its neutral position, the member 42 is lifted by the wedge-shaped point or cam portion of the trip 47 and the spring 41 at once separates the pinions, unless the operator prevents this action by keeping his foot against the foot pedal 35.

It is apparent that by the means hereinbefore described, I am enabled to obtain two speeds forward and one reverse by the exertion of very little fore and aft movement of the frame 7 and, therefore, the motion of the operator's hand can be long and easy, thus insuring that a child or delicate person shall have sufficient power to provide the requisite pressure to secure positive driving action. It will also be evident that the pinions may be placed by the sides of the rollers if desired. I may provide antifriction bearings at the points of support and for the shafts, if preferred, but as such bearings are common and well-known, I have chosen not to show them. It is to be noted that the shaft 32 may be carried in a fixed near position so far as distance from the shaft 24 is concerned and shifted lengthwise its axis far enough to unmesh the pinions 30 and 31 and to carry the roller 33 out of the plane of the rings 27 and 28. This lengthwise shifting of the shaft 32 may be provided for by affording more room in the casing wherein the gears are located and at the right hand end of the shaft, as will be evident without illustration. When thus shifted, it would not interfere with the forward motion necessary to engage the roller 26 and the ring 28 for reversing, but when returned to position it would be in position for low speed forward. The rollers 26 and 33 may be fastened to the shafts 24 and 32 respectively by very thin nuts or other suitable means which requires but little room and thus permit of placing the rings 27 and 28 close against the spokes of the wheel and thus away from harm and where they are less obtrusive as to appearance. It will also be seen that by the construction hereinbefore described the low speed desired is partly attained by keeping the ring 28 as large as possible and that the wheel rim affords a good place to fasten the ring. It will also be evident that the ball and socket member and the spring 5 can be attached to a variety of vehicle bodies and that the link 14 and the cable 38 can be of any desired length so that the mechanism is suited to various styles and sizes of vehicles. The frames 1 and 7 may be integral with the rear axle and the engine case respectively or otherwise firmly joined thereto as may be deemed most expedient.

From the foregoing, it will be seen that I have devised a simple and efficient form of construction of motor vehicle possessing the advantages hereinbefore alleged, and while the structural embodiment of the invention as hereinbefore disclosed is what I at the present time consider preferable, it is evident that the same is subject to modifications, changes and variations in detail, proportion of parts and relative arrangement thereof without departing from the spirit of the invention or sacrificing any of its advantages. I, therefore, do not wish to restrict myself to the particular details of construction hereinbefore disclosed but reserve the right to make such changes, modifications and variations as come properly within the scope of the protection prayed.

What is claimed as new is:—

1. In a motor vehicle driven by friction gearing, multiple driving pinions and multiple driven gears all carried in the same plane, and means for causing either of said driving pinions to drive at the will of the operator.

2. In a motor vehicle driven by friction gearing, multiple driving friction pinions of different sizes in the same fixed vertical plane, separate shafts carrying said pinions, multiple driven gears for coöperation therewith, and means for bringing any desired pinion into driving engagement with any desired gear.

3. In a motor vehicle driven by friction gearing, multiple driven gears and multiple driving pinions all carried in the same plane, and means provided for bringing any desired pinion into engagement with any desired gear.

4. In a friction gearing driven motor vehicle, driven gears of different sizes in the same fixed plane on the traction wheels thereof, a driving pinion on the motor shaft, a second driving pinion on a separate shaft and means for bringing this separate shaft into position where it is both driven and its pinion drives.

5. In a friction gearing driven motor vehicle, a driving pinion on its motor shaft and driven gears in the same fixed plane, the larger of which is affixed to the traction wheel rim and rollers of different sizes disposed between said gears, one of said rollers designed for engagement with the wheel rim.

6. In a motor vehicle driven by friction gearing, multiple supporting frames one within the other and movable with relation thereto, each having three points of suspension, one of such points being common to both frames and means for moving one frame with relation to the other, multiple driving friction pinions of different sizes in the same fixed vertical plane on separate shafts, coöperating multiple driven gears, and means for driving any desired pinion into driving engagement with any desired gear.

7. In a motor vehicle driven by friction gearing, multiple supporting frames each having three points of suspension, one of such points being common to both frames, said frames being mounted for movement relatively one to the other and slidably mounted at such common point of suspension, multiple driving friction pinions of different sizes in the same fixed vertical plane on separate shafts, coöperating multiple driven gears, and means for driving any desired pinion into driving engagement with any desired gear.

8. In a motor vehicle driven by friction gearing, multiple supporting frames each having three points of suspension, said frames being mounted for free sliding movement relatively at all times one to the other, and means for adjusting the throw of one of said frames.

9. In a friction gearing driven motor vehicle, multiple supporting frames each having a three point support to avoid distortion, one of the supports of one of said frames being a ball and socket one, and means provided with a sliding connection between the frames.

10. In a friction gearing driven motor vehicle, multiple supporting frames each having a three point support to avoid distortion, one of the supports of one of said frames being a ball and socket one, means provided with a free sliding connection between the frames, and means pivotally connected with the sliding frame for giving it motion.

11. In a motor vehicle driven by friction gearing, multiple frames each having a three point support, said frames being mounted for movement relatively to each other, an operating lever for moving one of the frames and a ratchet with neutral tooth for coöperation with said lever.

12. In a motor vehicle driven by friction gearing, supporting means having a double three point suspension, two independent frames one having at all times a sliding and the other a pivotal support at the front point of suspension, which latter is common to both of said frames.

13. In a motor vehicle driven by friction gearing, multiple frames each having a three point suspension, said frames being mounted independently of each other at their forward end for movement one relatively to the other, and an adjustable link connected with one of said frames, and means embodying said link for moving said frame.

14. In a motor vehicle driven by friction gearing, multiple driving friction pinions of different sizes in the same fixed vertical plane, relatively adjustable supporting means each having three points of suspension, means coöperating therewith for bringing the desired pinion into position to drive, some of said pinions being movable with one of said supporting means and means for moving one of said supporting means at its forward point of suspension, one of said supporting means being at all times free for sliding movement with relation to the other.

15. In a motor vehicle driven by friction gearing, a vehicle wheel, rings of different sizes carried thereby, one disposed in close proximity to the periphery of the wheel, coöperating friction drive mechanism, and relatively adjustable supporting frames each having a three point suspension, members of which driving mechanism are carried by one of said frames.

16. In a motor vehicle driven by friction gearing, friction rings of different sizes one disposed near the periphery of the wheel, independent frames each having a three point suspension, a friction roller carried by one of said frames for coöperation with either of said rings, and means for moving said frames.

17. In a motor vehicle driven by friction gearing, an engine case, an engine shaft, a pinion and a roller thereon, a shaft mounted in an eccentric bearing carried by the engine case, a roller carried by said shaft and a pinion on said shaft for coöperation with the pinion on the engine shaft.

18. In a motor vehicle driven by friction gearing, a vehicle wheel, rings of different sizes carried thereby, an engine shaft, a roller carried thereby for coöperation with either of said rings, a three point suspension frame for moving said roller, a pinion on the engine shaft, a pinion meshing therewith, a shaft carrying said pinion and a roller carried by said shaft, said last-named shaft being adapted to be driven by said pinions in a direction reverse from that of the engine shaft, whereby the roller on said shaft is brought into contact with one of said rings.

19. In a motor vehicle driven by friction gearing, a vehicle wheel, rings of different sizes carried thereby, rollers of different sizes for coöperation with said rings, independently movable frames suspended beneath the body and one of which carries said rollers, and means for actuating said rollers whereby the vehicle may be driven forward at reduced speed and with increased power.

20. In a motor vehicle driven by friction gearing, a relatively fixed frame, a second frame slidably supported at its forward end upon said relatively fixed frame and free at all times to slide with relation thereto, an adjustable link connection from said slidable frame, means embodying said link for moving said frame, and driving mechanism controlled by the movement of the sliding frame.

21. In a motor vehicle driven by friction gearing, multiple frames mounted for movement one relatively to and upon and within the other, one of said frames being mounted at its forward end upon a ball and socket mounting, an adjustable link connected with one of said frames to the rear of its support upon the other, and means embodying said link for moving one of said frames.

22. In a motor vehicle driven by friction gearing, multiple driving friction means, embodying two driving pinions and gears, independent shafts one for each pinion, means for bodily moving one of the driving pinions into engagement with the desired gear and means for moving the other pinion to cause its engagement with either gear.

23. In a motor vehicle driven by friction gearing, multiple driving friction means, embodying two driving pinions and gears, independent shafts one for each pinion, means for bodily moving one of the driving pinions into engagement with the desired gear and eccentric means for movement of the other pinion to cause its engagement with either gear.

24. In a motor vehicle driven by friction gearing, multiple driving friction means, independent shafts each carrying a gear, means for bodily moving one of the gears into engagement with the desired friction means, and means for rotary movement of another element to cause the engagement of the other gear with either friction means.

25. In a motor vehicle driven by friction gearing, a vehicle wheel, rings of different sizes carried thereby, rollers of different sizes for coöperation with said rings and all carried in the same vertical plane, supporting means therefor, and means for actuating said rollers whereby the vehicle may be driven forward at reduced speed and with increased power.

Signed by me at Washington, D. C., this 13th day of Jany. 1912.

CHARLES E. DURYEA.

Witnesses:
M. A. BOND,
E. B. BOND.